United States Patent [19]

Davis

[11] 4,153,553
[45] May 8, 1979

[54] APPARATUS FOR AND METHOD OF RECLAIMING AND CLEANING OIL FROM BOTTOM SETTLINGS OF TANKS

[76] Inventor: Larry R. Davis, Rte. 3, Box 616, Wichita Falls, Tex. 76308

[21] Appl. No.: 837,993

[22] Filed: Sep. 29, 1977

[51] Int. Cl.² .......................................... B01D 21/10
[52] U.S. Cl. ................................... 210/95; 210/167; 210/187; 210/209; 210/241; 210/540; 134/186
[58] Field of Search ..................... 210/56, 69, 71, 73, 210/83, 95, 181, 197, 147, 167, 540, 241, 209; 55/171, 356, 358; 134/10, 229, 24, 40, 175, 186

[56] References Cited

U.S. PATENT DOCUMENTS

| | | | |
|---|---|---|---|
| 994,100 | 5/1911 | Brown | 210/187 X |
| 1,806,740 | 5/1931 | Butterworth | 134/24 |
| 2,033,987 | 3/1936 | Jackson | 210/187 X |
| 2,552,452 | 5/1951 | Phillips | 210/187 X |
| 2,675,126 | 4/1954 | Williams | 210/187 X |
| 2,809,153 | 10/1957 | Bacsik et al. | 196/46.1 |
| 3,106,915 | 10/1963 | Key, Jr. | 126/343.5 A |
| 3,309,308 | 3/1967 | Schan | 208/178 |
| 3,385,439 | 5/1968 | Bach | 210/95 |
| 3,453,205 | 7/1969 | Francis, Jr. et al. | 208/187 |
| 3,565,252 | 2/1971 | Sheehy | 210/104 |
| 3,874,399 | 4/1975 | Ishihara | 134/24 X |
| 3,954,611 | 5/1976 | Reedy | 210/241 X |

Primary Examiner—John Adee
Attorney, Agent, or Firm—Wayland D. Keith

[57] ABSTRACT

A mobile unit for the treatment of BS to recover the saleable oil therefrom, and to clean the oil storage tank. The cleaning and treatment system is mounted on a truck or the like, so it can be taken to individual storage tanks from which the BS and water is to be removed from the bottom thereof and the storage tank cleaned. The components of the system are a BS treatment tank, a heating unit with a burner and coils, with the necessary pipes, valves and pumps to withdraw the BS from the bottom of the oil storage tank, heat and treat the BS until the water and marketable oil are separated and the saleable oil returned to the storage tank. The water and residue are discharged to a suitable place of disposal.

5 Claims, 8 Drawing Figures

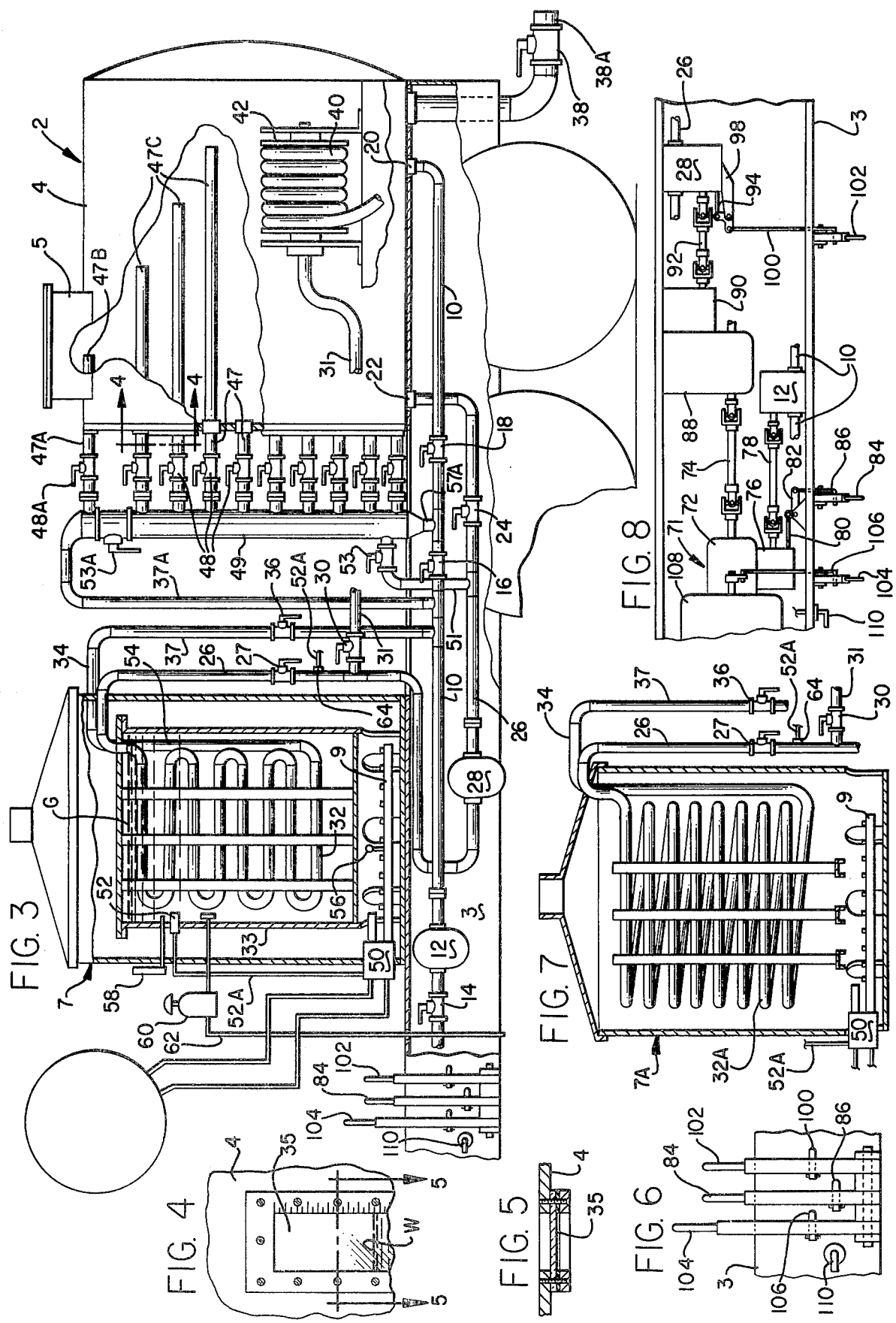

APPARATUS FOR AND METHOD OF RECLAIMING AND CLEANING OIL FROM BOTTOM SETTLINGS OF TANKS

BACKGROUND OF THE INVENTION

1. Field of the Invention

The invention relates to the removal of bottom settlings and water from the bottom of crude oil storage tanks. In the testing of oil, for purchase by a pipe line company, the more BS (bottom Settlings) and water in the oil the lower the grade, thence a lower price will be paid therefor. Therefore, it is extremely important that a minimum of BS and water be present in the oil being tested.

When the price of crude oil was relatively low, it was more economical to burn the BS and discharge the water into a salt water well or pit. With the growing scarcity of crude petroleum and the increase in the price thereof, it is desirable to separate the BS and water from useable crude. However, it is not economical to haul nor feasible to haul the crude oil containing the BS to a central point for removal of the water and for treatment of the BS to recover the oil therefrom as the storage tank could not be cleaned during the process.

2. Description of the Prior Art

Various methods and apparatus have been utilized hertofore in an effort to produce clean, saleable crude oil from bottom settlings by treating this with chemicals and by removal of the water. The following patents were found as result of a search conducted by the applicant: U.S. Pat. No. 2,033,987, No. 2,099,824, No. 2,166,893, No. 2,305,464, No. 2,235,639, No. 2,809,153, No. 3,016,915, No. 3,309,308, No. 3,453,205, No. 3,696,021, No. 1,990,293.

SUMMARY OF THE INVENTION

When crude oil is produced from wells, it is collected into large storage tanks, normally 100, 200 or 500 barrels capacity, with a "good" oil outlet being positioned about fourteen inches above the bottom of the tank. After the oil is produced into the tank, the pipe line company requires that it be quiescent and allowed to settle for at least 24 hours to allow water, mud and other foreign matter to settle to the bottom, which settlings will be below this outlet, which is fourteen inches from the bottom of the tank. The pipe line oil is then drawn off and the residue which remains in the bottom of the tank is known in the industry as bottom settlings, and is commonly referred to as BS. When the BS rises above this fourteen inch outlet, the BS must be removed.

When the price of crude oil was low, it was unprofitable to salvage the oil from the bottom settlings, therefore, it was drained into a slush pit for disposal. The oil content of the BS is usually rather high, in some instances as much as 60%, therefore, with the present high price of crude oil and in view of the energy crisis, it has become expedient, as well as profitable, to process and treat the BS in order to reclaim the oil therefrom. It is to this end that the present system has been devised. The present system is portable and can be used on individual storage tanks. The term treatment or treating as used herein covers the heating, the circulating and the use of chemicals to separate the oil from the BS so that it can be returned to the storage tank as marketable oil. This oil is also used to clean the storage tanks, after which it can again be processed to become saleable oil.

OBJECTS OF THE INVENTION

An object of this invention is to provide an apparatus for removing water and BS from an oil storage tank in a minimum of time, to reclaim the saleable oil and to discharge the water and other residue into a disposal well or to otherwise dispose of same.

Another object of the invention is to provide an apparatus for heating the oil containing crude oil that is removed from the bottom of an oil storage tank to cause the separation of the oil, water and other residue, and ot utilize the BS as a washing fluid to clean the bottom of the storage tank.

Still another object of the invention is to provide a batch treatment plant for treating the BS from the bottom of the storage tank by withdrawing the BS into the treatment unit, where it is heated and circulated to separate the oil and water from the solid residue, to which treatment process chemicals are added to hasten and facilitate a more thorough separation of the oil from the remainder of the BS which oil can be returned to the oil in the lower portion of the storage tank and sold.

Yet another object of the invention is to provide a treatment system for BS whereby a chemical or chemicals added thereto assist in breaking it down into water, useable oil and waste residue, whereby the interface between the oil and water may be determined through a sight glass, and the oil drained off to the interface for sale or reuse, and the water and residue disposed of.

Still a further object of the invention is to provide a portable treatment system for BS, which is effective in use and comparatively inexpensive to manufacture and to operate.

BRIEF DESCRIPTION OF THE DRAWINGS

With these objects in mind and others which will become manifest as the description proceeds, reference is to be had to the accompanying drawings, in which:

FIG. 3 is a fragmentary sectional view of a vehicle, such as a truck, showing the BS and water separation unit installed thereon, with various control valves and pumps being shown as are necessary for the operation of the system;

FIG. 4 is an enlarged, fragmentary view of a portion of a sight glass on the end of a treatment tank, so as to show the interface between the oil and water;

FIG. 5 is a sectional view taken on the line 5—5 of FIG. 4, looking in the direction indicated by the arrows;

FIG. 6 is a fragmentary view of the clutch and pump control levers, and also showing an engine throttling device thereon;

FIG. 7 is an elevational view of a modified heating coil, showing a burner thereunder and showing the spiral coil in elevation;

FIG. 8 is a fragmentary view of a vehicle, showing the location of the power take-off, the pumps and the controls therefor.

DETAILED DESCRIPTION OF THE INVENTION

Figure 1:
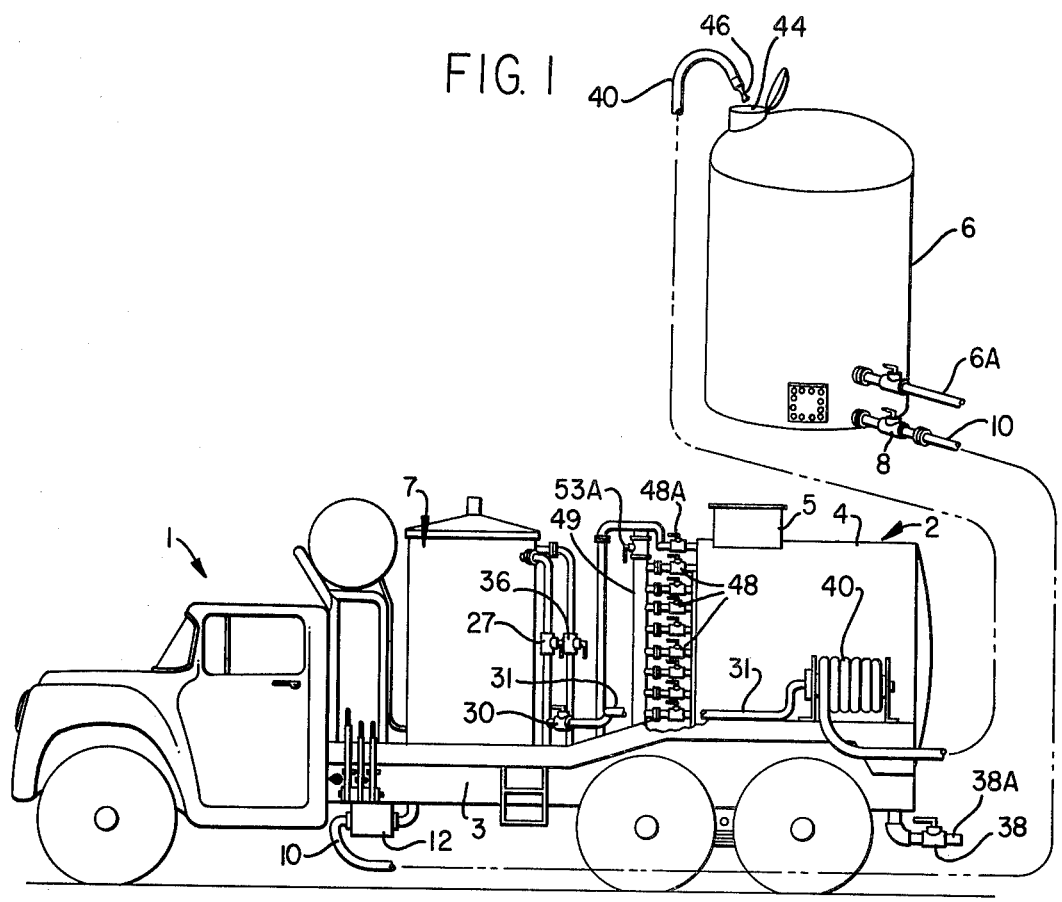
FIG. 1 is a side elevational view of a mobile unit, such as a truck, showing a tank and treatment apparatus thereon, connected in operative relation with an oil storage tank.
Figure 2:
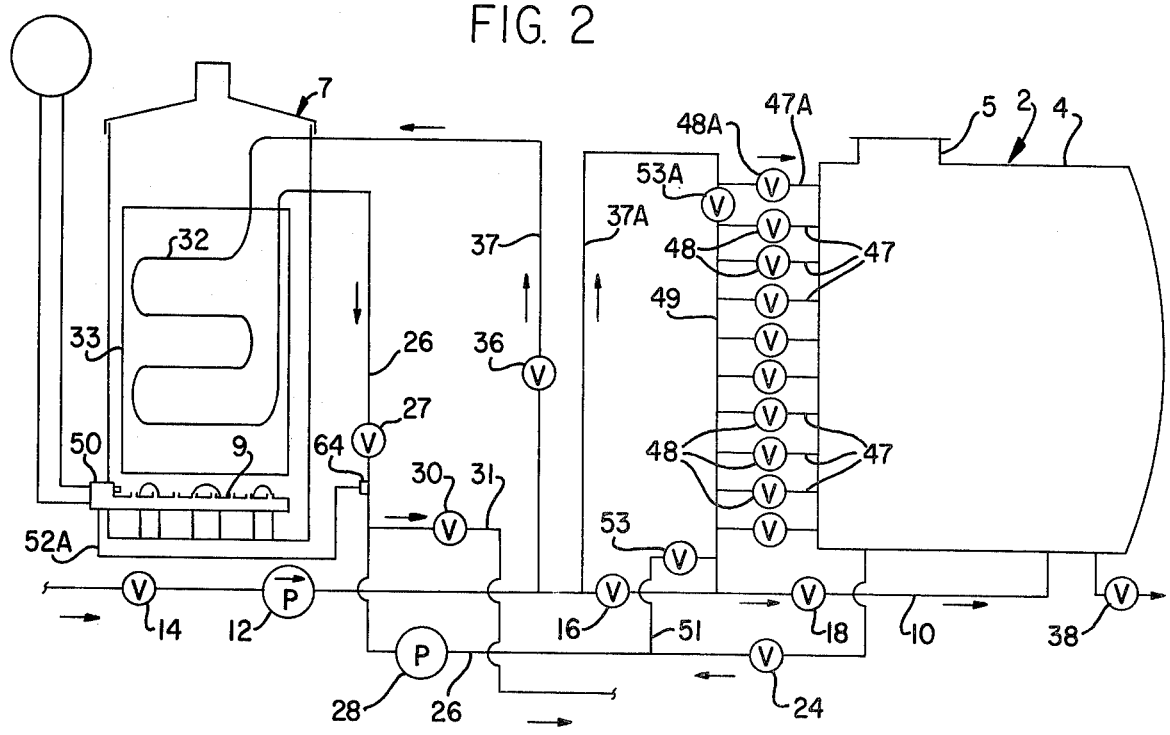
FIG. 2 is a diagrammatic view of the oil treating system, showing the BS and water storage tank, heating unit and pipes interconnecting the various units, with valves and pumps being provided to perform the desired functions.

With more detailed reference to the drawing in which like reference characters designate like parts in the several view thereof, in which the numeral 1 designates a vehicle, such as a truck or trailer, on which the present system, designated generally at 2, is mounted. The treatment unit may, however, be assembled on a skid, so it may be shifted from one vehicle to another. The numeral 3 designates a frame for mounting the present apparatus, which, for purposes of illustration, is a truck frame, but a trailer frame or a skid frame may be utilized, as the conditions of the particular job indicate.

A BS and water treatment tank 4 is mounted on one end of the frame 3, and the unit for heating the BS and water, designated at 7, and has a burner 9 thereunder, is mounted on the opposite end of the frame 3.

The BS and water pump 12 is designed to draw BS and water from the bottom of the oil storage tank 6 through valve 8 and pipe or hose 10, when suction is exerted thereon by pump 12, which pump is mounted on the frame 3. The pump 12 is driven by a power take-off 76, which is mounted on the frame 3 and is driven by the engine (not shown) of the truck. The pump 12 draws BS and water through valves 8, 14, 16 and 18 within pipe line or hose 10, when these valves are open. The pipe line or hose 10 leads from the oil storage tank 6 to the BS and water treatment tank 4 and through inlet opening 20 therein. With valve 14 in pipe 10 open and the pump 12 running, valve 27 in pipe 26 will be closed, valve 24 in pipe 26, leading to pump 28, will be open, and valve 30 in pipe or hose 31 will be open, which pipe or hose 31 leads to the hose 40 on reel 42, and the nozzle 46 of the hose 40 will be inserted into the top of storage tank 6. Pump 28 of a given capacity, will withdraw fluid from tank 4 through opening 22 into pipe 26, which fluid will be forced out through valve 30 into pipe 31 into hose 40 on reel 42. This fluid will be used to wash the BS and water from the walls and bottom of the storage tank 6, and will be discharged through pipe 10. The pump 12, which is of greater capacity than pump 28, will withdraw BS and water faster than the pump 28 will discharge the fluid into the tank 6, thereby the BS will be circulated and discharged from the storage tank 6 until the tank is empty, whereupon, the pumps 12 and 28 are stopped and the valves 8 and 14, in pipe 10, are closed. The storage tank 6 is now clean and all of the fluid is in treatment tank 4.

With the storage tank 6 cleaned and all the fluid from the bottom of the tank 6 in the treatment tank 4, the pump 28 is started, and with valve 24 in pipe 26 open and with the valve 30 in pipe 31 closed, and valve 27 in pipe 26 open, the fluid is directed from treatment tank 4 out through opening 22 in the bottom of tank 4 up through pipe 26 into the top of coil 32. The fluid, containing BS and water, is forced down through the coil 32 and out through pipe 54 into pipe 34, thence through open valve 36 in pipe 37, then with valves 16 and 18 in pipe 10 open, the fluid containing BS and water is circulated into treatment tank 4. The proper emulsion breaking chemical is then added to treatment tank 4 through manhole 5 to be intermixed with the BS and water fluid. With the fluid circulated in this manner, it is heated to the desired temperature, as indicated by thermometer 58 with a thermostat bulb 52 in the tank 33 controlling the thermo-sensor 50 to control the fuel supply to burner 9.

The fluid is normally heated to about 160 degrees and allowed to set quiescent for a time, about fifteen minutes, until the interface which forms between the oil and water W, which can be determined through sight glass 35.

The circulation is continued until the oil begins to break out of the emulsion. At this point the valves 16 and 18 in pipe 10 are closed, and valve 53A in manifold 49 is closed, and valve 48A in pipe 47A is opened, then valve 53 in pipe 51 is opened, which pipe 51 connects with the lower end of the manifold 49 and with pipe 26. All of the valves 48 in pipes 47, connected to manifold 49, are closed. Then a selected one of the valves 48 in an outlet pipe 47, above the interface of the water and oil, is opened and the fluid circulated into manifold 49 and out through pipe 51, and valve 53 into pipe 26 to pump 28 and through coil 32 as hereinbefore set out.

The pipe 37 discharges into pipe 37A, through a selected valve 48A into a pipe 47A, through the open valve 48A into a stub pipe 47B into the upper portion of the treatment tank 4, which allows the heated solution to be directed into the top of the tank 4 and drawn downward to the open valve 48, thereby heating that particular portion of the solution to the desired temperature. In so doing, the BS and water will separate and an interface will be formed, which interface can be determined through the sight glass 35, as the oil will rise. Whereupon, the now open valve 48 is closed, and a selected lower valve 48 in one or more pipes 47, above this point can be opened to enable the circulation of the oil and emulsion until a complete separation is had, as can be determined by the oil and water interface, as seen through sight glass 35. At this point the pump 28 is stopped for several minutes, normally about fifteen minutes, which enables the water in the remaining portion of the solution to settle into the water section and the oil to rise to define a static interface between the oil and water, which static oil and water interface is determined through sight glass 35. When the interface becomes static, the valve 48 immediately above the oil and water interface, within the "good" oil section, is opened and with the other valves 48 closed, a valve 48 immediately above the oil and water interface is opened to direct oil from treatment tank 4, through pipe 47 and through the open valve 48 into manifold 49 and with valve 53 in pipe 51 closed and with valve 24 closed, the valve 16 in pipe 10 is opened and with valve 18 closed and valve 8 and valve 14, in pipe 10, open, and with pump 12 running in reverse direction, oil is directed from manifold 49 out through pipe 57A into the lower part of storage tank 6 until the "good" oil is removed from the treatment tank 4. Then the valve 38, in pipe 38A, is opened and the water and BS residue are drained from the treatment tank 4 through pipe 38A and valve 38 into a suitable tank, pit, or other suitable means of disposal.

When the storage tank 6, of 150 barrel capacity, is filled with good oil and with the pipe line outlet pipe 6A in the storage tank 6 at the 14 inch level, the pipe 6A is connected with the pipe line's pipe or with a truck company's withdrawal pipe 6A, the oil may be rendered saleable and the greater portion of the BS and water removed therefrom by opening valves 8, 14, 16 and 18 in pipe 10 and manually moving the BS and water toward the discharge opening of pipe 10, until most of the BS and water have been drained from the storage tank 6, and the treatment tank 4 is substantially full of oil, water and BS to be treated, whereupon, the same process is followed in treating and heating the oil, as hereinbefore set out.

With the bottom settlings only to the 14 inch level in the tank 6, the oil may be withdrawn through pipe 10 into treatment tank 4 and the entire tank cleaned with hose 40 and nozzle 46, with the BS being drained from the bottom of the tank until that tank is in condition to be relocated.

The entire system can be reversed.

With the storage tank 6 completely drained of oil, and cleaned by washing with the fluid through hose 40 and nozzle 46 being used to wash the storage tank, the entire tank bottom may be pumped into treatment tank 4, and the water drained off as hereinbefore set out. The oil storage tank 6 may then be relocated and the oil remaining in the treatment tank 4, the water having been removed therefrom, the "good" oil may be discharged into the same tank, after it has been relocated, or into another tank, as desired.

With the pump 28 running, this circulation will be continued for several minutes. It is preferable to add emulsion breaking chemicals to the tank 4 as the BS and water are being circulated therethrough.

At this time, with the contents of the tank 4 and coils 32 having been heated to the desired temperature, or approaching the desired temperature, the oil and water are allowed to seek their respective levels in the tank 4 and from an interface therebetween. The interface between the oil and water may be observed through sight glass 35, to enable the good oil to be withdrawn, or recirculated, by opening one of the valves 48.

There are many chemicals commercially available for treatment of BS, and the particular chemical used is determined by the type of oil being treated and the condition of the BS.

The burner 9 is regulated by a thermostat which is indicated at 50, which thermostat control 50 has a sensor 52 within a closed tank 33, which tank is filled with a fluid, such as a glycol mixture G, so as to evenly heat the coil 32. A pilot light 56 is provided and interconnects with the gas and thermostat system so as to properly regulate the heat of the burner 9 and the lighting thereof. The thermometer 58 is provided to determine the temperature of the mixture being pumped through the system.

A pressure relief valve 60 interconnects with the interior of tank 33, so in event of over-expansion of the fluid, it will be discharged out through pipe 62 at a point remote from the burner 9.

An alternate thermo-couple connection is indicated at 64 in pipe 26 so as to enable the interchanging of heating units, such as shown in FIGS. 3 and 7.

MODIFIED FORM OF THE INVENTION

In some areas there is a minimum of water in the oil, or no water therein and the paraffin content is high. When these conditions exist, the heating unit 7, including the coil 32 therein, and the tank 33 are disconnected from the various pipe fittings and the various controls are disconnected, so the entire unit 7 can be removed from the vehicle, and the unit 7A, having coil 32A therein, is installed on the vehicle. The various connections are made, such as the thermostat 50 being connected to sense the heat of the oil in pipe 26. The sensor is connected by a coupling 64 to perform this function. However, in this form of the invention, the pressure relief valve 60 is dispensed with. Pipes 26 and 37 are connected in the same manner as in the form of the invention described above, to cause the "good" oil and the paraffin to mix, when the proper emulsion breaker is added to the treatment tank 4 and the fluid is circulated through the spiral coil 32A until the mixture is at the proper temperature, whereupon, the oil mixed with the de-emulsified paraffin is pumped into the oil storage tank to be sold at "good" oil.

The heating unit 7A, as shown in FIG. 7, may be interchanged with the heating unit 7, as shown in FIG. 3, and the various pipes connected to their respective counterparts on the truck and the thermo-sensor 52 connected with connection 64 with pipe 26 and the oil containing BS and water may be treated in the same manner as set out above for treating the BS, as shown in FIG. 3. However, from a safety point of view, the open flame from burner 7 is directed onto coil 32A to heat the mixture of oil, BS and water is more of a fire hazard than is the use of the unit as shown in FIG. 3. The mixture is, however, heated more quickly, and this manner of heating is preferred by some operators.

FIG. 8 is a top plan view (fragmentary) showing diagramatically a power train system, designated generally at 71, which has a clutch therein of conventional design, with a gear box 72 having a drive shaft 74 extending out of one end thereof, and having a power take-off 76 connected in driving relation with the gear box 72. A universal shaft 78 extends outwardly from the power take-off 76 and is connected with pump 12, which pump is connected to the pipe 10, as hereinbefore set out. The power take-off has a shaft 80 slidably extending into the power take-off 76 and is operated by a bell crank 82 which is connected to the shift lever 84 by a rod 86 to enable the engagement and disengagement of the power take-off 76 to connect and disconnect the pump 12 from the source of power. The drive shaft 74 also connects to a further gear box 88, which has a power take-off 90 connected thereto in driving relation. A universal shaft 92 leads from the power take-off 90 to the pump 28, which pump has pipes 26 connected thereto with a longitudinally slidable connection 94 which extends outward from the power take-off 90 and is connected with a bell crank lever 96, so upon longitudinal movement of rod 100, by means of a hand lever 102, the power take-off may be selectively engaged or disengaged to operate pump 28 in either direction, so as to direct fluid through pipe 26 connected thereto. A lever 104 is connected to longitudinally movable rod 106 to selectively engage and disengage a conventional clutch 108 in a manner well understood in the art of clutches. A throttle control rod 110, exterior of the frame 3, is connected with a suitable throttling device, such as a carburetor, in a manner well understood in the art of throttle controls.

The pumps 12 and 28 are reversible and will pump in either direction.

The terms conduit and conduit means have been used generically to cover both pipes and hose, as both pipes and hose are used to interconnect the various parts to permit the flow of fluid through the system.

Having thus described the invention, what is claimed is:

1. An apparatus for removing BS from the bottom of an oil storage tank, cleaning the oil storage tank and for separating oil and water from the BS, which oil storage tank has an inlet opening and an outlet opening formed therein, which apparatus comprises;

(a) a frame, (b) a BS treatment tank, having at least two inlet openings and an outlet opening formed therein, mounted on said frame,
  (1) conduit means in fluid communication between said oil storage tank and the BS treatment tank,
  (2) a first power driven reversible pump connected to said conduit means to withdraw BS from the oil storage tank and to direct the BS into said treatment tank,
(c) a coil having an inlet opening and an outlet opening formed therein, mounted on said frame and having the inlet opening thereof in fluid communication with said outlet opening of said BS treatment tank,
  (1) a burner means mounted on said frame in position to heat said coil,
  (2) a second power driven reversible pump, of lesser capacity than said first power driven reversible pump, attached to the outlet of said BS treatment tank and to the inlet of said coil for circulating the BS through the coil,
  (3) conduit means interconnecting the outlet of said coil to said treatment tank to direct heated BS to an inlet in said BS treatment tank,
  (4) said BS treatment tank having an opening formed therein to permit chemicals to be directed into the treatment tank,
  (5) time, chemicals and heat cause the separation of the oil and water from the BS, which oil and water form an interface,
  (6) a sight glass on said BS treatment tank through which to observe the interface of the separated oil and water,
  (7) said conduit means interconnecting said BS treatment tank and said oil storage tank provides a conduit through which cleaned, separated oil is returned, by said reversible pump, to said oil storage tank,
  (8) an outlet conduit in said BS treatment tank to direct the water from said BS treatment tank to a place of disposal.

2. An apparatus as defined in claim 1; wherein
(a) said BS treatment tank has an upright manifold adjacent thereto and supported thereby,
  (1) a plurality of conduits interconnecting said manifold and said BS treatment tank,
  (2) each said conduit having a valve therein,
  (3) a conduit interconnecting said manifold with said second reversible pump,
  (4) a valve intermediate the lower portion of the BS treatment tank and said second reversible pump to switch the pump into connected relation with the manifold to enable the selective withdrawal of fluid from the manifold or the discharge of fluid into the manifold,
  (5) a valve in said manifold between said oil inlet conduit and said oil outlet conduits,
  (6) valves within said conduit leading from said discharge conduit to said manifold,
  (7) a conduit connected to the discharge outlet of said coil and to a conduit connected to the upper portion of said BS treatment tank to direct heated BS thereinto,
  (8) a valve within said conduit to control the flow of fluid therethrough,
  (9) further conduits connected with said manifold and with said BS treatment tank for selective flow of fluid therethrough to enable oil free of water and BS to be withdrawn at selected levels therefrom in accordance with the oil and water interface in said sight glass,
  (10) valves within conduits leading to said second reversible pump to direct BS into the coil from the manifold to enable the recirculation of fluid to heat desired levels of fluid within said BS treatment tank.

3. An apparatus as defined in claim 1; wherein
(a) said BS inlet conduit connects to the discharge outlet of the heating coil extends into said BS treatment tank a spaced distance to direct the heated BS thereinto.

4. An apparatus as defined in claim 2; wherein
(a) said plurality of conduits connected to said manifold extend into said BS treatment tank staggered distances so as to selectively direct heated BS into the the BS treatment tank when the valve admitting heated fluid into the manifold is in one position and the valves connected to the staggered conduits are in selected open positions.

5. A apparatus as defined in claim 1; wherein
(a) said frame is a portable frame,
(b) power means on said portable frame is connected to said pumps.

* * * * *